United States Patent [19]

Korshak et al.

[11] 4,076,634
[45] Feb. 28, 1978

[54] COMPOSITION FOR ANTIFRICTION MATERIAL

[76] Inventors: Vasily Vladimirovich Korshak, ulitsa Gubkina, 4, kv. 81; Irina Alexandrovna Gribova, ulitsa Vavilova, 12, kv. 31; Alexandr Petrovich Krasnov, prospekt Kalinina, 31, kv. 28; Evgenia Semenovna Krongauz, Leningradsky prospekt, 26, kv. 60; Alla Markovna Berlin, ulitsa Obrucheva, 3, korpus 4, kv. 67; Olga Vladimirovna Vinogradova, 5 Parkovaya ulitsa, 56, korpus 6, kv. 35; Georgy Viktorovich Mamatsashvili, Ierusalimskaya ulitsa, 6, kv. 119; Saga-Silviya Alexandrovna Pavlova, ulitsa Garibaldi, 19, korpus 3, kv. 74; Pelageya Nikolaevna Gribkova, ulitsa Krasny Kazanets, 19, korpus 1, kv. 61; Nina Ivanovna Bekasova, Profsojuznaya ulitsa, 43"B", kv. 15; Ljudmila Grigorievna Komarova, B. Akademicheskaya ulitsa, 53a, kv. 6; Vladimir Dmitrievich Vorobiev, Novocheremushkinskaya ulitsa, 43/30, kv. 152; Irina Vladimirovna Vlasova, ulitsa Veernaya, 3, korpus 5, kv. 300, all of Moscow; Alexandr Vasilievich Vinogradov, prospekt RKKA, 180, kv. 56, Moskovskaya oblast, Zagorsk, all of U.S.S.R.

[21] Appl. No.: 626,205

[22] Filed: Oct. 28, 1975

[30] Foreign Application Priority Data

Oct. 28, 1974   U.S.S.R. .................. 2066134

[51] Int. Cl.² .................. C10M 5/00; C10M 7/00; F16D 69/00
[52] U.S. Cl. .................................... 252/12
[58] Field of Search ............. 252/12, 12.2, 12.4, 252/12.6

[56] References Cited

U.S. PATENT DOCUMENTS

| 3,467,596 | 9/1969 | Hermann | 252/12 |
| 3,629,103 | 12/1971 | Korshak et al. | 252/12 |
| 3,652,408 | 3/1972 | Korshak et al. | 252/12 |
| 3,721,625 | 3/1973 | McConnell et al. | 252/12 |
| 3,850,820 | 11/1974 | Korshak et al. | 252/12 |

Primary Examiner—Delbert E. Gantz
Assistant Examiner—Irving Vaughn
Attorney, Agent, or Firm—Haseltine, Lake & Waters

[57] ABSTRACT

The proposed composition contains from 5 to 98 parts by weight of polyphenylquinoxaline, from 1 to 94 parts by weight of an antifriction filler, from 0 to 40 parts by weight of a reinforcing filler, and from 0.1 to 10 parts by weight of a modifying dopant such as terephthalaldehyde, tetranitrile of pyromellitic acid, metal polyphosphinates or carborane-containing compounds.

The antifriction material on the basis of said composition features a low and stable coefficient of friction and provides for the operation of dry-friction assemblies constructed therefrom at temperatures of up to 350° C.

8 Claims, No Drawings

COMPOSITION FOR ANTIFRICTION MATERIAL

The present invention relates to compositions for antifriction materials.

Antifriction materials combine the properties of solid lubricants and structural materials. They are employed for manufacturing retainers, sliding bearing linings, various parts of gear trains used in dry-friction assemblies, etc.

Antifriction materials provide for a low coefficient of friction in the absence of ordinary liquid lubricants or lubricant greases.

The antifriction properties inherent in self-lubricating antifriction materials derive from the fact that the whole friction part constitutes a monolithic lubricating mass.

Materials of this kind are employed in friction assemblies where liquid lubrication is either impossible or prohibited, viz.: various electrovacuum devices, electronic instruments, cinema projectors, bearings for high-temperature applications and the like.

The prior art antifriction materials are manufactured from multi-component compounds employing polymers such as polyarylates, polycarbonates, polyamides, polyimides and the like as a binder, and widely known solid lubricants such as graphite, molybdenum disulphide and the like as fillers. The strength of the filler may be improved by addition thereto of fibrous filler components such as asbestos, fibre glass or asbestos fabric. To improve the thermal and electrical conductivity, moldability and hardness of the antifriction material, it may include metallic molybdenum, copper, nickel and other powders.

Said filler components are employed both singly and in combinations.

The filler level in the antifriction material may vary over a fairly wide range, its optimum being determined in each concrete case depending on the properties required from the end product.

It is known in the art to employ a range of compositions for antifriction materials designed for use in dry-friction conditions.

It is known in the art to employ a range of compositions for antifriction materials designed for use in dry-friction conditions.

The foregoing compositions include a polymeric binder constituted by polymers of various classes and solid lubricant fillers constituted by molybdenum disulphide, graphite and the like.

It is likewise known in the art to employ antifriction materials wherein the binder is constituted by polyimides combined with polyarylates and aromatic polyamides.

It is likewise known in the art to employ antifriction materials wherein the binder is constituted by polyimides combined with polyarylates and aromatic polyamides.

Said antifriction materials have several major drawbacks of which the leading one is their inadequate thermal stability. As the temperature rises to 250° C., the properties of the antifriction materials progressively deteriorate, with the result that the product loses weight and its performance drops.

It is an object of the present invention to develop a composition for antifriction material with a low and stable coefficient of friction in the temperature range up to 350° C.

The foregoing object is attained by the provision of a composition for antifriction material which, in accordance with the invention, contains from 5 to 98 parts by weight of polyphenylquinoxaline, from 1 to 94 parts by weight of an antifriction filler, from 0 to 40 parts by weight of a reinforcing filler, and from 0.1 to 10 parts by weight of a modifying dopant which may be terephthalaldehyde, tetranitrile of pyromellitic acid, metal polyphosphinates of the general formula $\{M\,[OP(RR')O]_x\}_n$ /1/, where $X = 2-3$; M is a bi- or trivalent metal/; R and R' are alkyl, cycloakyl alkylaryl or aryl groups, or carborane-containing compounds of the general formula R-X-R /2/, where

—$CB_{10}H_{10}C$—; R = H; —$C_6H_5$; —$CH_2OH$; $C_6H_5OH$; or —COOH, or of the general formula $+OC\,CB_{10}H_{10}C\,COR+_n$ /3/, where $n = 5-10$ for oligomers and $n = 200-300$ for polymers, while

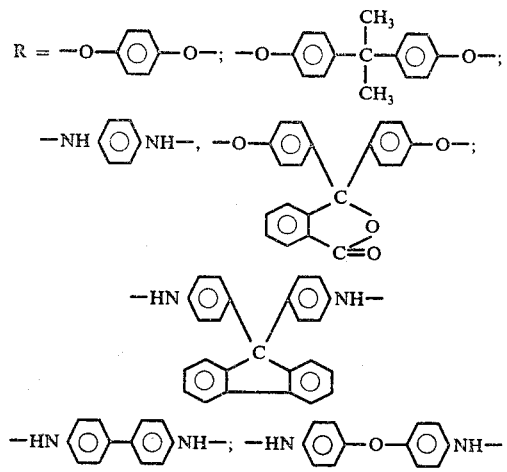

Besides, R may be represented by

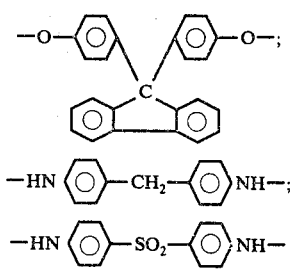

and other suitable compounds.

Said modifying substances may be included in the composition both signly and in various combinations one with another.

The polyphenylquinoxaline component included in the proposed composition for antifriction material, in accordance with the invention, together with the foregoing modifying dopants ensure a low and stable coefficient of friction of the material in a wide temperature range up to 350° C.

The term polyphenylquinoxaline is to be construed to imply well-known polymers (P.M. Hergenrother, "Macromolecules" 7, 575, 1974) of the following general formula

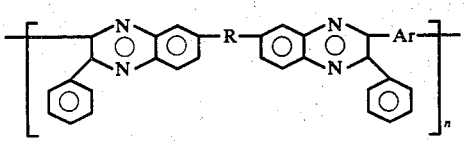

where n = 50–300;

R = a single bond, —O—; —SO$_2$, or —CO—; and

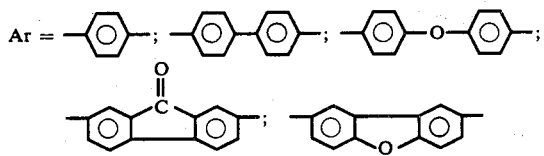

Besides, R may be —S—, and Ar may be m—C$_6$H$_4$;

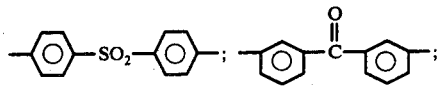

and the like.

Polyphenylquinoxalines feature excellent thermal and chemical stability and high moldability. Thus, for instance, polyphenylquinoxaline produced from 3,3',4,4'-tetraaminodiphenyl ether and 1,4-bis(phenyl-glyoxalyl)benzene and having a molecular weight of approximately 80,000 and viscosity in M-creosol $\eta$ = 0.83 dl/g, has a softening point of 280° C. (by thermomechanical curves). Thermogravimetric testing of the polymer in air at a temperature gradient of 4.5 deg/min indicates that its thermal destruction point lies at 500° C.

The antifriction fillers for the proposed composition may be both mineral and man-made substances with antifriction properties, the two major solid lubricants being graphite and molybdenum disulphide.

Said antifriction fillers are included in antifriction materials both singly and in combinations one with another as well as with reinforcing fillers such as asbestos and metal powders. The metal powders employed in antifriction materials may vary in dispersity; thus, use may be made of colloid silver of dispersity between 0.1 and 1.5 micron, whereas other feasible metal powders have a far higher dispersity. The quantity of the metal powder fillers depends on the specific requirements a given antifriction material is to meet.

The modifying dopants, in accordance with the invention, may be constituted by such compounds as terephthalaldehyde, tetranitrile of pyromellitic acid, metal polyphosphinates or carborane-containing compounds.

The term metal polyphosphinates is to be construed to mean the known polymers of the general formula {M [OP(RR')O]$_x$}$_n$, where M is a bivalent or trivalent metal, $X$ = 2–3, and R and R' are alkyl, cycloalkyl, alkylaryl or aryl groups (R.P. Block Inorg. Macromol. Revs., 115 (1970).

The carborane-containing modifying dopant, in accordance with the invention, may be constituted by o-carborane, m-carborane, phenyl-o-carborane, m-carboranic acid, dihydroxydiphenylcarborane, dihydroxymethylcarborane, carborane-containing polyesters on the basis of dichloranhydride of m-carboranedicarboxylic acid and the following bisphenols: hydroquinone, 4,4'-dihydroxydiphenyl-2,2-propane (diane), phenolphthalein and the like, as well as carborane-containing polyamides on the basis of dichloranhydride of m-carboranic acid and p-phenylenediamine, 4,4'-diaminodiphenyl (benzidine), 4,4'-diaminodiphenyl ether, 9,9-bis-(4-aminophenyl)-fluorene and the like. Said carborane-containing compounds are likewise known in the art.

The proposed composition may contain the above-described constituents in varying amounts:

A composition containing 40 parts by weight of polyphenylquinoxaline, 2 parts by weight of terephthalaldehyde and 58 parts by weight of graphite. It is used to manufacture antifriction bearing retainers and linings.

A composition containing 20 parts by weight of polyphenylquinoxaline, 0.2 part by weight of tetranitrile of pyromellitic acid and 79.8 parts by weight of molybdenum disulphide.

A composition containing 20 parts by weight of polyphenylquinoxaline, 10 parts by weight of manganese polydiphenylphosphinate and 70 parts by weight of molybdenum disulphide.

A composition containing 40 parts by weight of polyphenylquinoxaline, 2 parts by weight of carborane-containing polyamide produced from dichloranhydride of metacarboranic acid and 9,9-bis-(4-aminophenyl)fluorene and 58 parts by weight of graphite. The composition is used for manufacturing antifriction bearing retainers and linings.

A composition containing 40 parts by weight of polyphenylquinoxaline, 0.8 part by weight of carborane-containing polyamide produced from dichloranhydride of metacarboranic acid and 9,9-bis-(4-aminophenyl)-fluorene, 0.4 part by weight of zinc polydiheptylphosphinate and 58.8 parts by weight of graphite.

A composition containing 98 parts by weight of polyphenylquinoxaline, 1 part by weight of terephthalaldehyde and 1 part by weight of graphite. The composition is used for manufacturing gears.

A composition containing 25 parts by weight of polyphenylquinoxaline, 2.5 parts by weight of zinc polydiphenylphosphinate, 60 parts by weight of molybdenum disulphide, 5 parts by weight of graphite, 5 parts by weight of highly dispersed carbon and 2.5 parts by weight of metallic zinc powder. The composition is used for manufacturing sliding bearing linings.

The many different versions of the composition of this invention are designed to meet the diverse requirements to antifriction materials. Thus, metal powders improve the moldability of the composition and enhance the thermal and electrical conductivity of the antifriction material.

The compositions of this invention can be pressed into various dry-friction parts and assemblies, such as self-lubricating retainers for antifriction bearings and linings for sliding bearings.

The part can be brought strictly to size already at the stage of pressing the reason for which should be sought above all in the insignificant shrinkage of the material.

It is likewise possible to use the composition of the invention for manufacturing gears capable of providing for high speeds of shaft rotation.

Testing of the antifriction materials produced from said compositions revealed that at 350° C. their coefficient of friction was in the range from 0.02 to 0.12, entirely satisfactory for dry-friction assemblies required to operate in this temperature range.

The proposed composition for antifriction material is produced and converted to manufactured items by commonly used techniques for producing compositions for antifriction plastics and manufacturing products therefrom both by pressure molding and by casting, the antifriction material being obtained in the form of tablets, bars, linings, retainers and other products.

The proposed compositions for antifriction material contain from 5 to 98 parts by weight of polyphenylquinoxaline, from 0.1 to 10 parts by weight of at least one of the dopants listed hereabove, and from 1 to 94 parts by weight of the foregoing filler which may include, alongside graphite and molybdenum disulphide, highly dispersed carbon, asbestos, metal powders or mixtures thereof.

Polyphenylquinoxaline is so combined with the above-listed modifying dopants that the components are in immediate contact in the course of mixing. This kind of interaction of polyphenylquinoxaline and chemical dopants is effected both in an organic solvent and by mechanical agitation.

The proposed composition for antifriction material is prepared by mixing, e.g. in a vibratory mill, powdered polyphenylquinoxaline with modifying dopants and fillers. Said components are mixed until a homogeneous mixture has been obtained. The composition thus produced is subjected to pressing at a temperature of from 350° to 450° C. and a pressure between 600 and 2,800 kg/.sq.cm.

Under dry-friction conditions, the antifriction material experiences both thermal and mechanical loading. The polyphenylquinoxaline component together with said modifying dopants provide for a low and stable coefficient of friction of the antifriction material in a broad temperature range. Thus, the antifriction materials on the basis of the proposed composition employed in dry-friction assemblies easily withstand operating temperatures of up to 350° C., whereas the prior art antifriction materials have a thermal ceiling of only 220° to 240° C.

The above-mentioned modifying dopants cause cross-linking of the polyphenylquinoxaline, thereby raising the thermal stability of the antifriction material and improving its mechanical properties. Thus, for instance, a material on the basis of polyphenylquinoxaline, graphite and carborane-containing polyamide exposed for 7 hours to a temperature of 250° C. lost only 0.0170 g through wear, whereas a similar material having no carborane-containing polyamide lost 0.0223 g.

The antifriction materials on the basis of the proposed compositions exhibit very satisfactory structural properties: Brinell hardness, from 20 to 40 kg/sq.mm.; bending strength, from 500 to 1,500 kg/sq.cm.; impact strength, from 5 to 35 kg.cm/sq.cm.

The present invention will be further understood from the following examples illustrating the ways of preparing a composition for antifriction material and manufacturing an antifriction material from said composition, and also presenting test results.

EXAMPLE 1

The composition of this example was prepared by mixing the components in a vibratory mill. The composition was converted by pressing to specimens in the form of bushings of external diameter 22 mm and internal diameter 12 mm. The pressed specimens were tested for friction behaviour under end face friction conditions against steel at a linear velocity of 2 m/sec and a load of 2 kg/sq.cm.

The composition for antifriction material contained 40 parts by weight of polyphenylquinoxaline of the formula

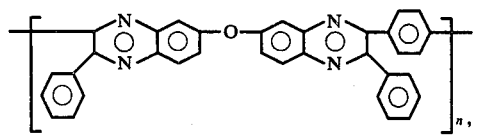

where $n$ = 120, produced from 3,3',4,4'-tetraaminodiphenyl ether and 1,4-bis-(phenylglyoxalyl)-benzene, as well as 2 parts by weight of terephthalaldehyde and 58 parts by weight of graphite.

The composition was pressed at 400° C. and 1,500 kg/cm$^2$.

At a temperature of 350° C. the coefficient of friction was equal to 0.056; in the temperature range from 150 to 350° C. it was between 0.05 and 0.06.

The antifriction material had an impact strength of 5 kg.cm/sq.cm. and a Brinell hardness of 20 kg/sq.mm.; the material was employed for manufacturing antifriction bearing retainers and linings.

EXAMPLE 2

The composition contained 20 parts by weight of the polyphenylquinoxaline of Example 1, 0.2 part by weight of tetranitrile of pyromellitic acid and 79.8 parts by weight of molybdenum disulphide. The specimens were prepared and tested in procedures duplicating those of Example 1.

At 350° C. the coefficient of friction was 0.06, while in the temperature range between 150° and 350° C. from 0.048 to 0.06.

EXAMPLE 3

The composition contained 20 parts by weight of the polyphenylquinoxaline of Example 1, 10 parts by weight of manganese polydiphenylphosphinate and 70 parts by weight of molybdenum disulphide. The specimens were pressed at a temperature of 400° C. and a pressure of 1,000 atm. The specimens were tested in a procedure duplicating that of Example 1.

The coefficient of friction was 0.06 at 350° C. and between 0.038 and 0.062 in the temperature range from 150° to 350° C.

EXAMPLE 4

The composition contained 40 parts by weight of the polyphenylquinoxaline of Example 1, 2 parts by weight of carborane-bearing polyamide produced from dichloranhydride of metacarboranic acid and 9.9-bis-(4-aminophenyl)fluorene, and 59 parts by weight of graphite. The specimens were prepared and tested in procedures duplicating those of Example 1.

The coefficient of friction was 0.025 at 350° C. and from 0.014 to 0.025 in the temperature range from 150° to 350° C.

EXAMPLE 5

The composition contained 5 parts by weight of polyphenylquinoxaline of the formula

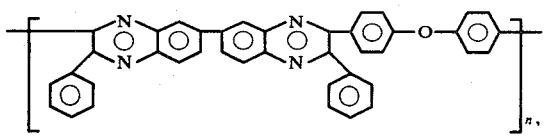

where n = 180, produced from 3,3'-diaminobenzidine and 4,4'-bis-(phenylglyoxalyl)diphenyl ether, 4.9 parts by weight of zinc polydiphenylphosphinate, 0.1 part by weight of m-carboranic acid and 90 parts by weight of molybdenum disulphide.

The specimens were prepared and tested in procedures duplicating those of Example 3.

The coefficient of friction was 0.11 at 350° C. and from 0.07 to 0.12 in the temperature range between 150 and 350° C.

EXAMPLE 6

The composition contained 15 parts by weight of polyphenylquinoxaline of the formula

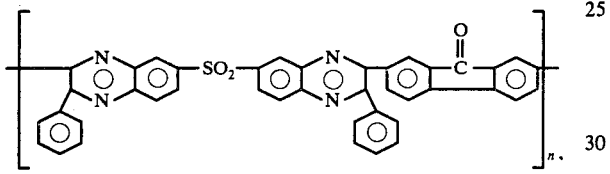

where n = 50, produced from 3,3',4,4'-tetraaminodiphenylsulphone and 2,7-bis-(phenylglyoxalyl)fluorenone, 5 parts by weight of zinc polydiphenylphosphinate, 0.2 part by weight of phenyl-o-carborane, 50 parts by weight of molybdenum disulphide, 15 parts by weight of highly dispersed carbon, 5 parts by weight of molybdenum powder and 9.8 parts by weight of silver powder. The specimens were pressed at a temperature of 350° C. and a pressure of 1,000 atm and tested in a procedure duplicating that of Example 1.

The coefficient of friction was 0.10 at 350° C. and from 0.06 to 0.12 in the temperature range from 150 to 350° C.

EXAMPLE 7

The composition contained 40 parts by weight of polyphenylquinoxaline of the formula

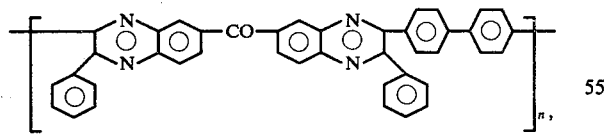

where n = 120, produced from 3,3',4,4'-tetraaminobenzophenone and 1,4-bis-(phenylglyoxalyl)diphenyl, 3 parts by weight of carborane-containing polyamide produced from dichloranhydride of m-carboranic acid and 4,4'-diaminodiphenyl, and 57 parts by weight of graphite. The specimens were prepared and tested in procedures duplicating those of Example 1.

The coefficient of friction was 0.027 at 350° C. and from 0.014 to 0.027 in the temperature range from 150° to 350° C.

EXAMPLE 8

The composition contained 98 parts by weight of the polyphenylquinoxaline of Example 1, 1 part by weight of terephthalaldehyde and 1 part by weight of graphite. The specimens were manufactured at a temperature of 380° C. and a pressure of 660 kg/sq.cm. and tested in a procedure duplicating that of Example 1.

The coefficient of friction was 0.06 at 350° C. and from 0.07 to 0.04 in the temperature range from 150° to 350° C. The composition was used to manufacture gears. The antifriction material from said composition had an impact strength of 35 kg.cm/sq.cm. and a Brinell hardness of 30 kg/sq.mm.

EXAMPLE 9

The composition contained 7 parts by weight of the polyphenylquinoxaline of Example 5, 3 parts by weight of zinc polydiphenylphosphinate, 5 parts by weight of molybdenum disulphide, 30 parts by weight of highly dispersed carbon, 20 parts by weight of graphite, 1 part by weight of asbestos and 34 parts by weight of nickel powder. The specimens were prepared and tested in procedures duplicating those of Example 3.

The coefficient of friction was 0.11 at 350° C. and from 0.12 to 0.10 in the temperature range from 150° to 350° C.

EXAMPLE 10

The composition contained 40 parts by weight of polyphenylquinoxaline of the formula given in Example 1 with n = 300, 0.8 part by weight of the carborane-containing polyamide of Example 4, 0.4 part by weight of zinc polydiheptylphosphinate and 58.8 parts by weight of graphite. The specimens were prepared and tested in procedures duplicating those of Example 1.

The coefficient of friction was 0.02 at 350° C. and from 0.014 to 0.02 in the temperature range from 150° to 350° C.

EXAMPLE 11

The composition contained 20 parts by weight of the polyphenylquinoxaline of Example 1, 1 part by weight of m-carborane and 79 parts by weight of molybdenum disulphide. The specimens were prepared and tested in procedures duplicating those of Example 3.

The coefficient of friction was 0.10 at 350° C. and from 0.07 to 0.01 in the temperature range from 150° to 350° C.

EXAMPLE 12

The composition contained 40 parts by weight of the polyphenylquinoxaline of Example 1, 2 parts by weight of bis-(hydroxymethyl)-o-carborane and 58 parts by weight of graphite. The specimens were prepared and tested in procedures duplicating those of Example 3.

The coefficient of friction was 0.011 at 350° C. and from 0.24 to 0.011 in the temperature range from 150 to 350° C.

EXAMPLE 13

The composition contained 30 parts by weight of polyphenylquinoxaline of the formula

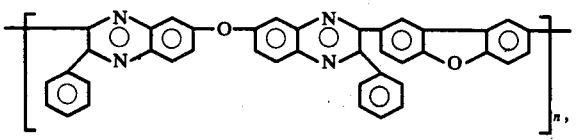

where n = 100, produced from 3,3',4,4'-tetraaminodiphenyl ether and 3,6-bis-(phenylglyoxalyl)-dibenzfuran, 2 parts by weight of carborane-containing polyester produced from dichloranhydride of m-carboranic acid and phenolphthalein, 28 parts by weight of molybdenum disulphide and 40 parts by weight of copper powder.

The specimens were prepared and tested in procedures duplicating those of Example 3.

The coefficient of friction was 0.12 at 350° C. and from 0.07 to 0.12 in the temperature range from 150° to 350° C.

EXAMPLE 14

The composition contained 5.5 parts by weight of the polyphenylquinoxaline of Example 1, 0.5 part by weight of carborane-containing polyester produced from dichloranhydride of m-carboranic acid and hydroquinone, and 94 parts by weight of molybdenum disulphide.

The specimens were prepared and tested in procedures duplicating those of Example 3.

The coefficient of friction was 0.03 at 350° C. and from 0.06 to 0.03 in the temperature range from 150° to 350° C.

EXAMPLE 15

The composition contained 20 parts by weight of the polyphenylquinoxaline of Example 1, 10 parts by weight of zinc polydiphenylphosphinate and 70 parts by weight of molybdenum disulphide.

The specimens were prepared and tested in procedures duplicating those of Example 1.

The coefficient of friction was 0.05 at 350° C. and from 0.05 to 0.12 in the temperature range from 150° to 350° C.

EXAMPLE 16

The composition contained 25 parts by weight of polyphenylquinoxaline of the formula

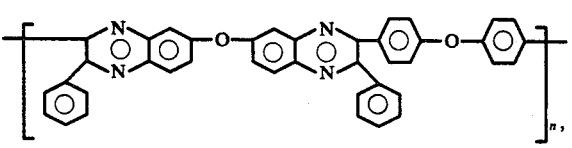

where n = 200, produced from 3,3',4,4'-tetraaminodiphenyl ether and 4,4'-bis-(phenylglyoxalyl)-diphenyl ether, 2.5 parts by weight of zinc polydiphenylphosphinate, 60 parts by weight of molybdenum disulphide, 5 parts by weight of highly dispersed carbon, 5 parts by weight of graphite and 2.5 parts by weight of metallic zinc powder. The specimens were prepared and tested in procedures duplicating those of Example 1.

The coefficient of friction was 0.12 at 350° C. and from 0.07 to 0.12 in the temperature range from 150° to 350° C.

The composition was used to manufacture sliding bearing linings.

EXAMPLE 17

The composition contained 40 parts by weight of the polyphenylquinoxaline of Example 1, 2 parts by weight of bis-(hydroxyphenyl)-o-carborane and 58 parts by weight of graphite.

The specimens were prepared and tested in procedures duplicating those of Example 3.

The coefficient of friction was 0.02 at 350° C. and from 0.05 to 0.02 in the temperature range from 150° to 350° C.

What is claimed is:

1. A composition for antifriction material, containing from 5 to 98 parts by weight of a polyphenylquinoxaline of the formula:

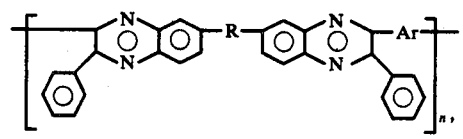

where
$n = 50-300$
R is a single bond; —O—; —SO$_2$— or —CO;

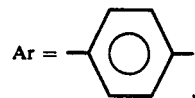

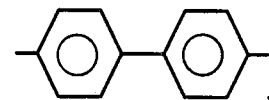

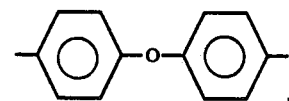

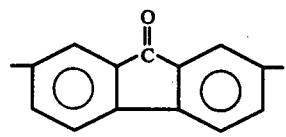

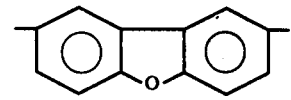

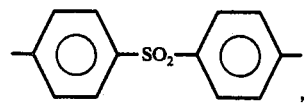

or

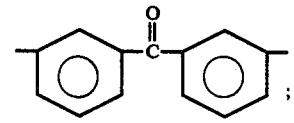

from 1 to 94 parts by weight of an antifriction filler, selected from the group consisting of powdered graphite, molybdenum disulphide, highly dispersed carbon and mixtures thereof; from 0 to 40 parts by weight of a reinforcing filler selected from the group consisting of powdered metallic copper, silver, nickel, zinc, molybdenum, asbestos and mixtures thereof; and from 0.1 to 10 parts by weight of a modifying dopant selected from the group consisting of terephthalaldehyde, tetranitrile of pyromellitic acid, metal polyphosphinates of the general formula {M[OP(RR')O]$_x$}$_n$ /1/, where M is a bi- or trivalent metal, X=2−3, and R and R' are each selected from the group consisting of alkyl, cycloalkyl, alkylaryl and aryl, and carborane-containing compounds of the general formula R-X-R /2/, where

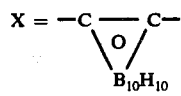

or [—CH$_{10}$H$_{10}$C—]—CB$_{10}$H$_{10}$C— R= —H; —C$_6$H$_5$; —CH$_2$OH; —C$_6$H$_5$OH; —COOH, or of the general formula +OC CB$_{10}$H$_{10}$C COR+$_n$ /3/, where $n$ = 5−10 for oligomers and $n$ = 200−300 for polymers, while

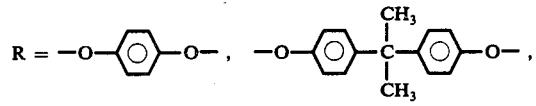

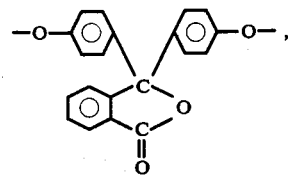

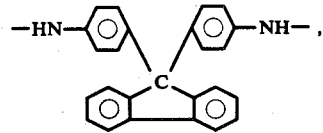

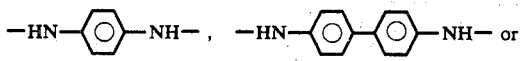

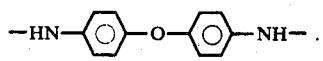

2. A composition for antifriction material as claimed in claim 1, which contains 40 parts by weight of polyphenylquinoxaline, 2 parts by weight of terephthalaldehyde and 58 parts by weight of graphite.

3. A composition for antifriction material as claimed in claim 1, which contains 20 parts by weight of polyphenylquinoxaline, 0.2 parts by weight of tetranitrile of pyromellitic acid and 79.8 parts by weight of molybdenum disulphide.

4. A composition for antifriction material as claimed in claim 1, which contains 20 parts by weight of polyphenylquinoxaline, 10 parts by weight of manganese polydiphenylphosphinate and 70 parts by weight of molybdenum disulphide.

5. A composition for antifriction material as claimed in claim 1, which contains 40 parts by weight of polyphenylquinoxaline, 2 parts by weight of carborane-containing polyamide and 58 parts by weight of graphite.

6. A composition for antifriction material as claimed in claim 1, which contains 40 parts by weight of polyphenylquinoxaline, 0.8 part by weight of carborane-containing polyamide, 0.4 part by weight of zinc polydiheptylphosphinate and 58.8 parts by weight of graphite.

7. A composition for antifriction material as claimed in claim 1, which contains 98 parts by weight of polyphenylquinoxaline, 1 part by weight of terephthalaldehyde and 1 part by weight of graphite.

8. A composition for antifriction material as claimed in claim 1, which contains 25 parts by weight of polyphenylquinoxaline, 2.5 parts by weight of zinc polydiphenylphosphinate, 60 parts by weight of molybdenum disulphide, 5 parts by weight of graphite, 5 parts by weight of highly dispersed carbon and 2.5 parts by weight of powdered metallic zinc.

* * * * *